Sept. 17, 1963  E. AGERMAN ET AL  3,103,810
SUPPORTING MEANS FOR A MEASURING DEVICE FOR MECHANICAL FORCES
Filed Feb. 19, 1959  3 Sheets-Sheet 1
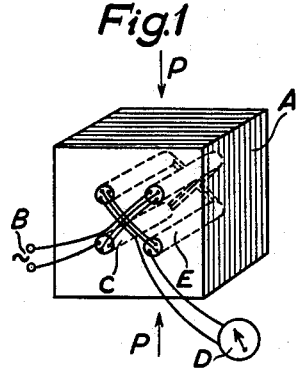
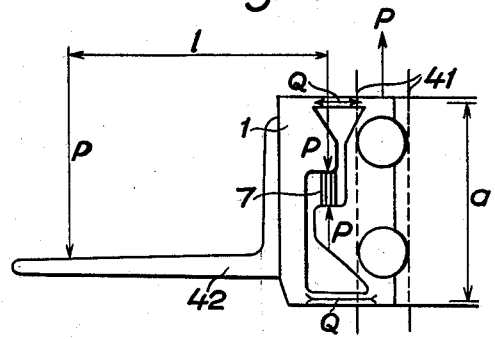
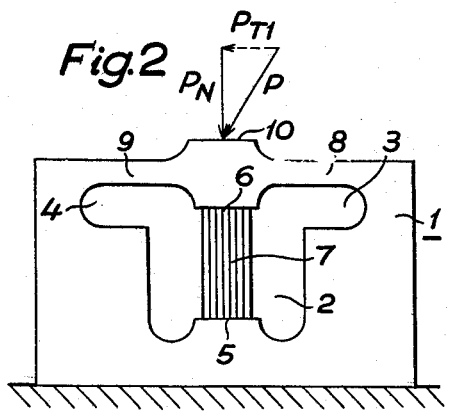
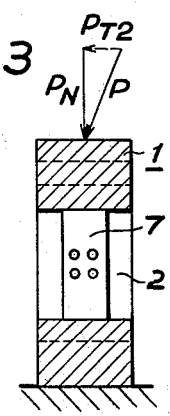
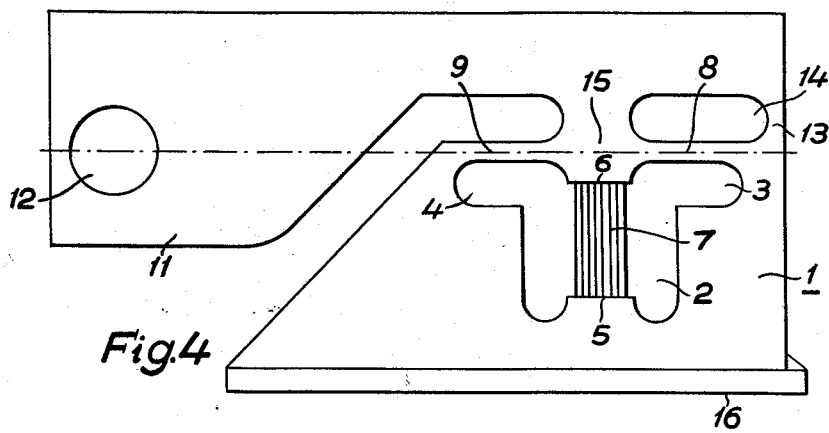
INVENTORS
ERIK AGERMAN
RUNE FLINTH
BY
Bailey, Stephens & Huettig
Attorneys

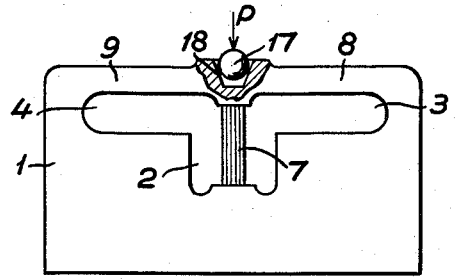
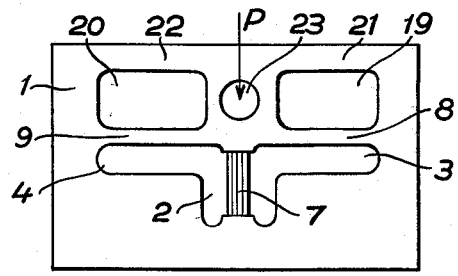
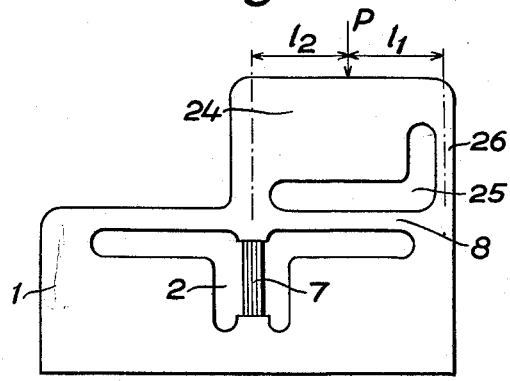

Sept. 17, 1963     E. AGERMAN ET AL     3,103,810
SUPPORTING MEANS FOR A MEASURING DEVICE FOR MECHANICAL FORCES
Filed Feb. 19, 1959     3 Sheets-Sheet 3
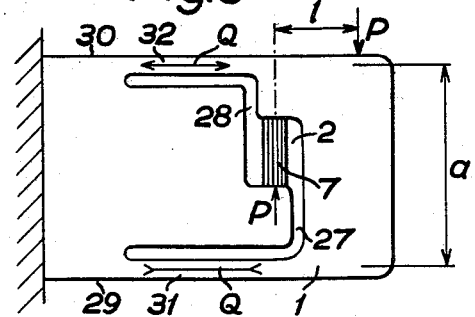
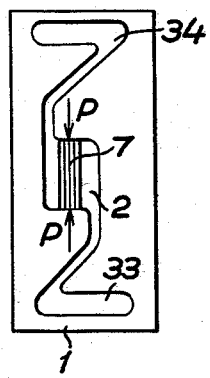
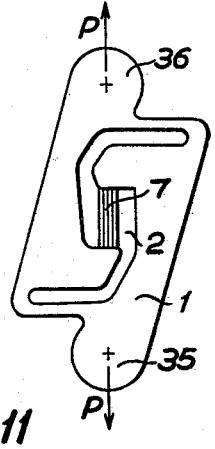
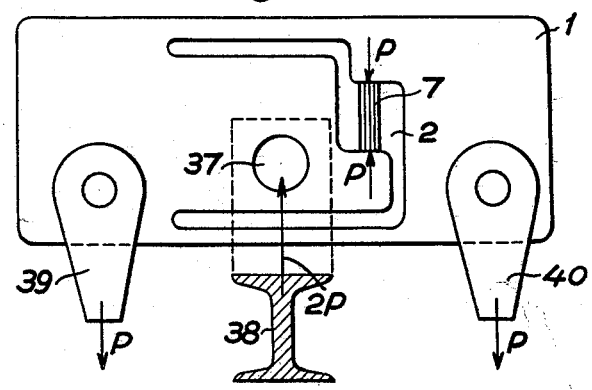
INVENTORS
ERIK AGERMAN
RUNE FLINTH
BY
Attorneys United States Patent Office 3,103,810
Patented Sept. 17, 1963

3,103,810
SUPPORTING MEANS FOR A MEASURING
DEVICE FOR MECHANICAL FORCES
Erik Agerman, Fjardhundrag. 25A, and Rune Flinth,
Hammarbacksvagen 30A, both of Vasteras, Sweden
Filed Feb. 19, 1959, Ser. No. 794,458
Claims priority, application Sweden Feb. 20, 1958
22 Claims. (Cl. 73—141)

The present invention relates to supporting means for a measuring device of the magnetic type, for example as disclosed and claimed in Patent No. 2,895,332.

The said application describes a measuring device for measuring mechanical forces, comprising a measuring body of magnetic material adapted to be so subjected to the said forces that mechanical stresses are produced therein, a coil fed from an electric current source and serving as an exciting coil, and a voltage-sensitive coil serving as a measuring coil, said coils having their winding planes substantially at right angles to the plane of said body and being so arranged that their mutual inductance is substantially zero when said body is not subjected to said forces.

This type of measuring device has generally considerable height in relation to its area exposed to the compressive load, and it is desired to construct supporting means which can absorb applied forces which are out of parallel with the sensing direction of the measuring device, and thereby eliminate the possibility of tilting and/or deforming the said device. One possible solution of this problem would be to arrange levers or the like mounted pivotally at one end in some supporting device, so that said levers would absorb all forces out of parallel with said sensing direction of said measuring device, but an arrangement of this kind would be encumbered by bearing friction and free motion margin. The measuring device of the above mentioned type has an output voltage pressure characteristic which is linear except for relatively small loads, and it is therefore desirable to mount the measuring device in a pre-stressed condition to make it work on the linear part of said characteristic.

The present invention relates to means for the solution of the above mentioned supporting problem and according to the invention the supporting means in its main features, comprises a one-piece block provided with an aperture in which the measuring device of the class described is mounted between two opposite sides in a pre-stressed condition, said block further being provided with a number of slots to make sections of it resilient in the sensing direction of the measuring device.

The aperture and the slots are cut in the block in such a way that sections of the block are given a relatively small thickness or gauge, and these sections thereby operate as springs when the forces are applied. During the springlike action of these resilient sections of said block, one side of the aperture, in which the measuring device is mounted, is displaced a certain distance in the direction of the other opposite side of the aperture, or the two sides of the aperture are displaced in opposite directions, thereby transmitting the applied force from the block to said measuring device, the mechanical force acting on the measuring device being in its sensing direction, i.e. in a direction which is substantially parallel to the planes of sheet of the known measuring device, and forming an angle of approximately 45° with the winding planes of the coils of the known measuring device. The axis of the said device which is later on referred to, is always the axis of the said device which is lying in the sensing direction of the said device.

The slots could be leading from the said aperture in which the measuring device is mounted and/or be placed in other convenient parts of the block.

The invention will now be described in detail with reference to the accompanying drawings in which:

FIGURE 1 shows schematically a measuring device of the class described in the said application Serial No. 475,142 to be mounted in the blocking according to the invention, FIGURE 2 shows a side view of one embodiment of the block, FIGURE 3 shows an end view of the block in FIGURE 2, FIGURES 4 to 10 show different embodiments of the block.

FIGURE 11 shows the block according to FIGURE 8, used as a traverse equalizer, and FIGURE 12 shows the block according to FIGURE 9 used in the fork-supporting carriage of a forklift truck, an overhead travelling crane or the like.

Referring to FIGURE 1, A denotes a measuring body of magnetic material which consists of a plurality of sheets placed upon each other and assembled, for example by glueing, B denotes an alternating or direct current source connected to an exciting coil C, and D denotes a voltage sensing instrument connected to a measuring coil E. The measuring device is shown only in principle in FIGURE 1 and the embodiment of this device actually used, with its slender construction and small projections of the body A, on which the mechanical force is allowed to act, is shown in the cited Patent No. 2,895,332 and need not be repeated here.

In all the FIGURES 2 to 12, 1 denotes the block according to the invention, 2 the aperture in which the measuring device is mounted and 7 the measuring device itself of the type shown in FIGURE 1.

In FIGURES 2 and 3 there is shown a block 1 which is provided with an aperture means including an aperture 2 with slots 3 and 4 leading from the upper right and left corners of said aperture, leaving the block with resilient sections 8 and 9 to act as springs if active force is applied vertically to the surface 10 of the block. The said slots 3 and 4 could be given very small depth, and the aperture 2 could be given more breadth to obtain the same resilient sections 8 and 9, but an aperture 2 of considerable height and breadth would reduce the rigidity of the block. Between two opposite parallel sides or surfaces 5 and 6 of the aperture 2, the measuring device 7 is mounted in a pre-stressed condition, i.e. the measuring device 7 is placed in the aperture 2 after a certain displacement of the resilient sections 8 and 9 in an outward direction. The sensing direction of the measuring device (that is, the direction of the pressure to which it primarily responds) is parallel to a line perpendicular to the seats 5 and 6. As the block is very rigid in the directions $P_{T1}$ and $P_{T2}$, it is only the vertical component $P_N$, of a force P which is not applied vertically to the surface 10, which will be transmitted to the measuring device. The horizontal components $P_{T1}$ and $P_{T2}$ of said force P are unable to tilt said block if it is fixed on rigid supporting means.

In FIGURE 4 is shown a one-piece block 1 with an extension 11, which acts as a lever, said extension being provided with a hole 12 for supporting for example a shaft or the like, the force being applied to the block through said shaft or the like. The extension 11, just above the slot 3, is provided with another slot 14. The block section 13 acts as a pivoting point for the extension, and the block section 15 transmits the force applied in the hole 12 to the measuring device 7. 16 denotes supporting means on which the block 1 is fixed.

In the shown embodiment of the block the extension 11 acts as a lever and multiplies the force applied to the hole 12 when transmitted to the measuring device 7. It is therefore possible to use the said known type of measuring devices for measuring smaller forces than before.

In FIGURE 5 is shown an embodiment of the block 1 in which it is desirable to eliminate undesired moment of a force P applied to the block. According to the invention the point of action of the force is sunk a certain distance into the block. To obtain this sinking a cone-shaped recess 18 is made in the upper side of the block directly above the aperture 2 in which the measuring device 7 is mounted, and in said recess is placed a ball 17, the circular contact line of ball and recess respectively preferably lying in the neutral zone of the resilient sections 8 and 9.

In FIGURE 6 is shown a block 1 which, above the aperture 2, the slots 3 and 4 and the measuring device 7, is provided with two or more slots 19 and 20 placed symmetrically in relation to the vertical axis, i.e. the sensing direction, of said device 7, so dividing the block into a number of resilient sections 8, 9, 21 and 22. The block may have more than two slots above the aperture 2, but to obtain the same sensibility of the measuring device for a certain force, the resilient sections must have smaller cross sections. This embodiment of the block, with the same breadth as the block shown in FIGURES 2 and 5, gives increased rigidity against forces applied in the direction of $P_{T2}$, as shown in FIGURE 3, compared with the block embodiments of FIGURES 2 and 5. It is desirable to use the above mentioned embodiment of the block as supporting means for pulley wheels or travelling wheels on trolley carriages, trucks or the like.

In FIGURE 7 is shown a block type to minimize the applied force P, in which the block 1 above the aperture 2 is provided with an extension 24, its breadth being substantially half the breadth of the block and the said extension being provided with at least one slot 25 to obtain a resilient block section 8 in the intermediate part between the lower part of the block and the said extension. The block section 26 acts as a pivoting point for the extension 24, as with the lever-like extension shown in FIGURE 4. The acting force P is minimized in the ratio $$\frac{l_1}{l_1+l_2}$$

where $l_1$ denotes the distance between the force P and the vertical axis of the section 26 of the block and $l_2$ denotes the distance between the force P and the vertical axis in the sensing direction of the measuring device 7.

In FIGURE 8 is shown a block type in which the block is provided with two slots 27 and 28 each leading from one of two diagonally opposite corners of the aperture 2 in which the measuring device 7 is mounted. The slots extend in the direction of two opposite sides 29 and 30 of the block respectively and close to the sides of the block, the slots extend parallel to each other and in the same direction, which is substantially vertical to the sensing direction of the measuring device 7. The shape of the slots itself could differ, but it is essential that the slots leave resilient sections 31 and 32 at the said opposite sides of the block and that the sections of the block on which the measuring device 7 rests have the necessary rigidity, so that no resilience is to be found in these sections. In a block of this type the measuring device 7 measures only the component of the acting force P which is parallel to the vertical axis in the sensing direction of the measuring device, regardless of the distance between the force P and the said axis of the measuring device. The moment to be exerted is transformed to tensile respectively compressive forces Q in the resilient sections 31 and 32 of the block, said forces $$Q=\frac{Pl}{a}$$

where $a$ denotes the distance between the axis of the resilient sections of the block and $l$ denotes the distance between the force P and the said axis of the measuring device.

In FIGURE 9 is shown a block 1 with reduced breadth in comparison with the block shown in FIGURE 8. To obtain the smaller breadth the two slots 33 and 34, relatively close to two opposite sides of the block respectively, extend substantially parallel to each other and in the opposite direction, leaving resilient sections in the block at the said two opposite sides of the block.

In FIGURE 10 is shown a block 1 in which tensile force P acting on the block is converted to compressive force acting on the measuring device 7. The block is provided with the same type of slots which are shown in FIGURE 9 and further provided with extensions 35 and 36 on each of the aforesaid opposite sides of the block, the point of action of the force to be measured being placed on the extensions 35 and 36 so that the force acts along the said axis of measuring device 7. As mentioned in connection with the block shown in FIGURE 8, it is essential too that in the blocks shown in FIGURES 9 and 10, the block sections on which the measuring device 7 rests, have such rigidity that no resilience is to be found in these sections.

FIGURE 11 shows a block 1 according to FIGURE 8, used as a traverse equalizer. The block is pivoted on a shaft or the like, said hole being placed between the slots. The shaft or the like is mounted on supporting means 38. The two rope mountings of the traverse are attached to each end of said block outside the area of the slots and the aperture 2.

FIGURE 12 shows a block 1 substantially of the type shown in FIGURE 9 used for measuring loads on a forklift truck, an overhead travelling crane or the like. Preferably two of these blocks are mounted between the fork 42 and the fork-supporting carriage which slides on the vertical guideway 41 of the truck, crane or the like. As mentioned in connection with FIGURE 8, the moment to be exerted is transformed to tensile respectively compressive forces Q in the resilient sections, said forces $$Q=\frac{Pl}{a}$$

where $a$ denotes the distance between the axis of the resilient sections of the block and $l$ denotes the distance between the force P and the said vertical axis of the measuring device 7. The compressive force on the measuring device 7 is not influenced by the friction loss in the wheels of the carriage or the friction loss between the carriage and the guideway. If the carriage is mounted in a truck with a tiltable guideway, the compressive force is influenced by the tilting angle of the guideway in relation to the vertical plane. To obtain the right measuring results it is therefore necessary always to make the measuring at a certain tilting angle.

The block according to the invention presents a robust machine element which can be used in the construction of machinery as a part of the construction itself and not as an added part which would, for example, make a heavier construction.

The statement that the slots are integrally enclosed within the material of the block means that the material of the block between the slots and the outside of the block is integral, that is, it is not cut through or otherwise separated, or, in any event, is so constructed that no shifting of the material on one side of the slot with respect to the material on the other side is possible.

Although only several specific embodiments of the invention have been described in detail, it will be appreciated that various modifications in the form, number and arrangement of parts may be made without departing from the spirit and scope of the invention, for example the said measuring device may be replaced by other measuring devices, for example by strain-gauges mounted on a small block.

We claim:
1. A measuring device for measuring mechanical forces, comprising a pressure-sensitive measuring body adapted to be subjected to said forces, and supporting means for said body comprising a block provided with an aperture having two opposite and parallel sides, said measuring body being lodged in a prestressed condition between and in engagement with said parallel sides with the sensing direction of said measuring body perpendicular to said parallel sides, said block being further provided with a number of slots penetrating said block in the same direction as said aperture and having a substantially longitudinal cross-section the longitudinal direction of which is at least in part substantially parallel to said parallel sides, said slots being located within said block to provide said block with sections having relatively small cross-section, extending in a direction substantially parallel to said parallel sides and being resilient in a direction perpendicular to said parallel sides, said slots being integrally enclosed within the block.

2. A measuring device for measuring mechanical forces, comprising a measuring body of magneto-strictive material adapted to be so subjected to the said forces that mechanical stresses are produced therein, said body being provided with two coils, the inductive coupling between which varies in proportion to said stresses due to the magneto-strictive properties of said body, and supporting means for said body comprising a block provided with an aperture having two opposite and parallel sides, said measuring body being lodged in a prestressed condition between and in engagement with said parallel sides with the sensing direction of said measuring body perpendicular to said parallel sides, said block being further provided with a number of slots penetrating said block in the same direction as said aperture and having a substantially longitudinal cross-section the longitudinal direction of which is at least in part substantially parallel to said parallel sides, said slots being located within said block to provide said block with sections having relatively small cross-section, extending in a direction substantially parallel to said parallel sides and being resilient in a direction perpendicular to said parallel sides, said slots being integrally enclosed within the block.

3. A measuring device for measuring mechanical forces, comprising a measuring body of magnetostrictive material adapted to be so subjected to the said forces that mechanical stresses are produced therein, said body being provided with two coils, the inductive coupling between which varies in proportion to said stresses due to the magnetostrictive properties of said body, and supporting means for said body comprising a one-piece block of homogeneous material provided with an aperture having two opposite and parallel sides, said measuring body being lodged in a prestressed condition between and in engagement with said parallel sides with the sensing direction of said measuring body perpendicular to said parallel sides, said block being further provided with a number of slots penetrating said block in the same direction as said aperture and having a substantially longitudinal cross-section the longitudinal direction of which is at least in part substantially parallel to said parallel sides, said slots being located within said block to provide said block with sections having relatively small cross-section, extending in a direction substantially parallel to said parallel sides and being resilient in a direction perpendicular to said parallel sides, said slots being integrally enclosed within the block.

4. A measuring device for measuring mechanical forces, comprising a measuring body of magnetostrictive material adapted to be so subjected to the said forces that mechanical stresses are produced therein, said body being provided with two coils, the inductive coupling between which varies in proportion to said stresses due to the magnetostrictive properties of said body, and supporting means for said body comprising a one-piece block of homogeneous material provided with an aperture of rectangular form having two opposite and parallel sides, said measuring body being lodged in a prestressed condition between and in engagement with said parallel sides with the sensing direction of said measuring body perpendicular to said parallel sides, said block being further provided with two slots penetrating said block in the same direction as said aperture and extending from each one of two adjacent corners of said aperture, situated on opposite sides of the lodging site of said measuring body, said slots extending from said corners in opposite directions but at least in part parallel to one another and to said parallel sides and close to one side of said block, thereby providing between said slots and said side of the block sections of the block having a relatively small cross-section, extending in a direction substantially parallel to said parallel sides and being resilient in a direction perpendicular to said parallel sides, said slots being integrally enclosed within the block.

5. A measuring device for measuring mechanical forces, comprising a measuring body of magnetostrictive material adapted to be so subjected to the said forces that mechanical stresses are produced therein, said body being provided with two coils, the inductive coupling between which varies in proportion to said stresses due to the magnetostrictive properties of said body and supporting means for said body comprising a one-piece block of homogeneous material and rectangular form provided with an aperture of rectangular form placed substantially in the middle of said block, said aperture having two opposite and parallel sides, said measuring body being lodged in a prestressed condition between and in engagement with said parallel sides with the sensing direction of said measuring body perpendicular to said parallel sides, said block being further provided with two slots penetrating said block in the same direction as said aperture and extending from each one of two diagonally opposite corners of said aperture at least partially in the same direction, parallel to one another and to said parallel sides and close to opposite sides of said block, thereby providing said block with two block sections between said slots and said opposite sides, said block sections having a relatively small cross-section, extending substantially parallel to said parallel sides and being resilient in a direction perpendicular to said parallel sides, said slots being integrally enclosed within the block.

6. A measuring device for measuring mechanical forces, comprising a measuring body of magnetostrictive material adapted to be so subjected to the said forces that mechanical stresses are produced therein, said body being provided with two coils, the inductive coupling between which varies in proportion to said stresses due to the magnetostrictive properties of said body, and supporting means for said body comprising a one-piece block of homogeneous material and rectangular form provided with an aperture of rectangular form placed substantially in the middle of said block, said aperture having two opposite and parallel sides, said measuring body being lodged in a prestressed condition between and in engagement with said parallel sides with the sensing direction of said measuring body perpendicular to said parallel sides, said block being further provided with two slots penetrating said block in the same direction as said aperture and extending from each one of two diagonally opposite corners of said aperture at least partially in opposite directions but parallel to one another and said parallel sides and close to opposite side of said block, thereby providing said block with two block sections between said slots and said opposite sides, said block sections having a relatively small cross-section, extending substantially parallel to said parallel sides and being resilient in a direction perpendicular to said parallel sides, said slots being integrally enclosed within the block.

7. A measuring device for measuring mechanical forces, comprising a measuring body of magnetostrictive material adapted to be so subjected to the said forces that mechanical stresses are produced therein, said body being provided with two coils the inductive coupling between which varies in proportion to said stresses due to the magnetostrictive properties of said body, and supporting means for said body comprising a one-piece block of homogeneous material provided with an aperture of rectangular form having two opposite and parallel sides, said measuring body being lodged in a prestressed condition between and in engagement with said parallel sides with the sensing direction of said measuring body perpendicular to said parallel sides, said block being further provided with two slots penetrating said block in the same direction as said aperture and extending from each one of two corners of said aperture, said two corners being on opposite sides of the lodging site of said measuring body in said aperture, each slot extending from one of said corners at least in part parallel to said parallel sides and close to an outer side of said block, thereby providing between said slot and said outer side a section of said block having a relatively small cross-section, extending in a direction parallel to said parallel sides and being resilient in a direction perpendicular to said parallel sides, said slots being integrally enclosed within the block.

8. A device as claimed in claim 7, wherein said block above said aperture and slots is provided with an extension, said extension being adapted to be so subjected to said forces that mechanical stresses are applied to said measuring body in a multiple way, the said extension acting as a lever and being attached to said block in at least one place.

9. A measuring device for measuring mechanical forces comprising a relatively rigid pressure measuring body adapted to be subjected to said forces so that mechanical stresses are produced therein, and supporting means for said body comprising a block provided with an aperture means therethrough, said block having first and second parts forming opposed seats and each constituting a part of the wall of said aperture means, said measuring body being lodged in a pre-stressed condition between and in engagement with said seats and having a sensing direction in the same direction as a line perpendicular to the seats, said block having at least one third part one side of which forms a portion of the wall of said aperture means, said third part being of substantially greater length than thickness with its length extending in a direction transverse to the said line and being relatively resilient in a direction parallel to said line and forming a part of the connection between said seats, said aperture means being integrally enclosed within the block.

10. In a device as claimed in claim 9, said body having substantially greater rigidity in all directions transverse to said line than said third part.

11. A device as claimed in claim 9, in which said measuring body is a body of magnetostrictive material provided with two coils, the coupling between which varies in proportion to said stresses due to the magnetostrictive properties of said body.

12. A device as claimed in claim 9, in which said body is a one-piece block.

13. A measuring device for measuring mechanical forces comprising a relatively rigid pressure measuring body adapted to be subjected to said forces so that mechanical stresses are produced therein, and supporting means for said body comprising a block provided with an aperture means therethrough, said block having first and second parts forming opposed seats each constituting a part of the wall of said aperture means, and having a space therebetween, said measuring body being lodged in a pre-stressed condition between and in engagement with said seats and having a sensing direction in the same direction as a line perpendicular to the seats, said aperture means having open extensions of said space forming third and fourth parts of the block, one side of each of said third and fourth parts forming a part of the wall of said aperture means, said third and fourth parts being of substantially greater length than thickness with their lengths extending in a direction transverse to the said line and forming a part of the connection between said seats, said aperture means being integrally enclosed within the block.

14. In a device as claimed in claim 13, said third and fourth parts being substantially aligned in a direction transverse to the line.

15. In a device as claimed in claim 14, said third and fourth parts being symmetrical with respect to a central plane through the measuring body transverse to the length of the third and fourth parts.

16. In a device as claimed in claim 15, said block including a lever part having one end flexibly connected thereto, said lever part including a section aligned with one of said seats between said third and fourth parts.

17. In a device as claimed in claim 15, said block having a spherical projection associated therewith aligned with one of said seats between said third and fourth parts.

18. In a device as claimed in claim 15, said block having second and third apertures therethrough on the opposite sides of said third and fourth parts from said extensions of said aperture means, and fifth and sixth parts dividing said second and third apertures from the outside of the block, said fifth and sixth parts being of substantially greater length than thickness in the direction transverse to said line and being resilient in a direction parallel to said line.

19. In a device as claimed in claim 13, said third and fourth parts being located at opposite sides of the block.

20. In a device as claimed in claim 19, said third and fourth parts being located substantially entirely on the same side of a central plane of said measuring body transverse to the length of the third and fourth parts.

21. In a device as claimed in claim 19, said third and fourth parts being of equal length.

22. In a device as claimed in claim 21, said third and fourth parts being located on opposite sides of a central plane of the measuring body transverse to the length of said third and fourth parts.

References Cited in the file of this patent

UNITED STATES PATENTS

| | | |
|---|---|---|
| 2,698,371 | Yao Tzu Li | Dec. 28, 1954 |
| 2,814,946 | Harris | Dec. 3, 1957 |
| 2,859,613 | Green | Nov. 11, 1958 |
| 2,895,332 | Dahle et al. | July 21, 1959 |
| 2,935,213 | Cellitti et al. | May 3, 1960 |